United States Patent
Ahnsorge et al.

(10) Patent No.: US 6,334,904 B1
(45) Date of Patent: Jan. 1, 2002

(54) WATER-SOLUBLE, WATER-SOFTENING BUILDER

(75) Inventors: Harald Ahnsorge, Ludwigshafen (DE); Paul Robinson, Mira (IT)

(73) Assignee: Reckitt Benckiser N.V., Hoofddorp (NL)

( * ) Notice: Subject to any disclaimer, the term of this patent is extended or adjusted under 35 U.S.C. 154(b) by 0 days.

(21) Appl. No.: 09/402,786

(22) PCT Filed: Apr. 3, 1998

(86) PCT No.: PCT/EP98/01971

§ 371 Date: Dec. 17, 1999

§ 102(e) Date: Dec. 17, 1999

(87) PCT Pub. No.: WO98/45400

PCT Pub. Date: Oct. 15, 1998

(30) Foreign Application Priority Data

Apr. 9, 1997 (DE) ............................................... 197 14 657

(51) Int. Cl.$^7$ ................................ C02F 5/00; C02F 5/10; C11D 3/37
(52) U.S. Cl. .......................... 134/42; 252/175; 252/180; 252/181; 510/224; 510/446; 510/447; 510/531
(58) Field of Search ...................................... 252/175, 180, 252/181; 510/446, 447, 224, 531; 134/42

(56) References Cited

U.S. PATENT DOCUMENTS

| | | | | | |
|---|---|---|---|---|---|
| 5,328,633 A | * | 7/1994 | Hasting et al. | ............... | 252/181 |
| 5,618,465 A | * | 4/1997 | Durbut et al. | ............... | 510/221 |
| 5,801,137 A | * | 9/1998 | Addison et al. | ............... | 510/228 |
| 5,853,430 A | * | 12/1998 | Shindo et al. | ..................... | 8/137 |
| 5,858,299 A | * | 1/1999 | Fernholz et al. | ............. | 264/414 |
| 5,861,366 A | * | 1/1999 | Ihns et al. | ..................... | 510/320 |
| 5,900,399 A | * | 4/1999 | Seiter et al. | ................... | 510/446 |

FOREIGN PATENT DOCUMENTS

| | | | | |
|---|---|---|---|---|
| DE | 4318902 A1 | * | 12/1994 | |
| EP | 0 504 091 A1 | * | 3/1992 | ............... C11D/3/00 |
| EP | 0 812 808 A1 | * | 12/1997 | ............... C02F/5/10 |

* cited by examiner

*Primary Examiner*—Mark Kopec
*Assistant Examiner*—Brian P. Mruk
(74) *Attorney, Agent, or Firm*—Heller Ehrman White and McAuliffe

(57) ABSTRACT

The invention provides a water-soluble, water-softening builder in the form of a tablet comprising 40–98% by weight of a combination of a) one or more organic, multifunctional polycarboxylic acid(s) or alkali metal salts thereof, and b) a polymer with water-softening properties in an a:b weight ratio of from 80:20 to 50:50, where the polymer with water-softening properties is a partially neutralized polyacrylic acid having a molecular weight of 1500–8000.

5 Claims, No Drawings

WATER-SOLUBLE, WATER-SOFTENING BUILDER

BACKGROUND OF THE INVENTION

The invention relates to a water-soluble, water-softening builder in the form of a tablet.

Water-softening builders in tablet form are widely known. Tablets have a variety of advantages over powder products: they are easier to dose and handle and can be added more easily to the laundry, they are more compact and permit cost-effective storage.

Water softening tablets are sold commercially (Calgon 2-phase tabs) and such tablets are described in EP-A1-0 628 627 (Benckiser), CH-577 937 (Lonza), WO-A1-95/21908 (Henkel) and EP-A2-0 622 449 (Hüls).

Water-softening tablets are usually prepared by compressing or compacting water-softening powders. It is, however, difficult to find a balance between the required hardness and abrasion resistance of the tablets and their property of disintegrating and/or dissolving quickly in the wash liquor. Tablets which have been prepared using only a slight compacting pressure tend to crumble and to break up during handling and packaging; tablets which have undergone greater compaction are more durable, but do not disintegrate or disperse in the wash liquor as well either.

A variety of solutions have already been proposed, particularly for detergent tablets, for improving their physical properties (strength, abrasion resistance and dispersibility).

GB 983243 and GB 989683 (Colgate-Palmolive) disclose detergent tablets having improved dissolution properties, which have been prepared by compaction of spray-dried detergent powders and spraying with water or aqueous sodium silicate solution to reduce the proportion of fine particles. The whole tablet is coated with a film-forming polymer to improve the abrasion resistance. The use of polyacrylic acid is not disclosed.

EP-A-0 466 484 (Unilever) discloses detergent tablets comprising compacted particles having a narrow size distribution and uniform and regular particle size. This results in the advantage of an attractive appearance and better disintegration in the wash liquor.

EP-A2-0 522 766 discloses detergent tablets comprising compacted particulate detergent compositions in which at least some of the particles have been coated with a material which acts as a binder, but which also promotes disintegration in the wash liquor. Although polymers are claimed as suitable disintegrant additives, polyacrylic acid is not disclosed.

EP-A2-0 711 828 (Unilever) discloses a process for the preparation of detergent tablets by compaction of particulate detergent compositions in which a binder is distributed which has a melting point in the range of 35–90° C., where compaction to give tablets takes place at a temperature above 28° C. but below the melting temperature of the binder. Polyacrylates are mentioned as possible binders, but polyacrylic acid is not disclosed.

Polymers and copolymers of acrylic acid are known constituents of detergents and water softeners. It has also already been proposed to add alkali metal salts of such polymers or copolymers to tablet formulations.

WO-A1-92/18604 (Henkel) discloses a process for the preparation of detergent tablets for dishwashers, where compositions comprising alkali metal polyacrylate are agglomerated and dried in a fluidized bed.

WO-A1-93/00419 (Henkel) discloses a process for the preparation of detergent tablets for dishwashers, where a prehydrated mixture of alkali metal polyacrylate and sodium carbonate is prepared, which is then mixed with the other components of the tablet.

WO-A1-95/21908 (Henkel) discloses tablets which comprise builders, including layer silicates and which have a reduced water content and are reportedly notable for good solubility in water. Salts of polyacrylates are mentioned here as disintegrants.

EP-A1-628 627 (Benckiser) discloses a water-soluble, water-softening builder in the form of a tablet consisting of
A) 60–98% by weight of a combination of
  a) citrate and/or citric acid and
  b) a polymer which acts as a water softener in an a:b weight ratio of from 70:30 to 50:50, preferably from 65:35 to 55:45,
B) 0.5–6% by weight of polyethylene glycol
C) 0–38% by weight of other auxiliaries.

Although polyacrylic acid can be regarded as a polymer with water-softening properties, the use of polyacrylic acid is not expressly described in this publication.

SUMMARY OF THE INVENTION

The invention provides improved tablet properties (hardness, strength, abrasion resistance, solvency in the wash liquor) of water-soluble, water-softening builders in the form of a tablet. It has been found that this object can be achieved in tablets which comprise 40–98% by weight of a combination of a) an organic, multifunctional polycarboxylic acid or alkali metal salts thereof, and b) a polymer with water-softening properties, by using polyacrylic acid in acid form as the polymer with water-softening properties. In particular, the aim according to the invention is to use a polyacrylic acid having a molecular weight of from 1500 to 8000.

DETAILED DESCRIPTION OF THE PREFERRED EMBODIMENTS

The invention thus provides a water-soluble, water-softening builder in the form of a tablet comprising 40–98% by weight of a combination of
a) one or more organic, multifunctional polycarboxylic acid(s) or alkali metal salts thereof, and
b) a polymer with water-softening properties in an a:b weight ratio of from 80:20 to 50:50, wherein the polymer with water-softening properties is a partially neutralized polyacrylic acid having a molecular weight of 1500–8000.

An organic, multifunctional polycarboxylic acid is taken to mean a polybasic carboxylic acid having additional functional groups, for example hydroxyl groups and/or amino groups. Suitable multifunctional polycarboxylic acids are gluconic acid, tartaric acid and citric acid. Preference is given to citric acid which, like the other acids, can be used in acid form or as an alkali metal salt.

The polyacrylic acid to be used according to the invention is taken to mean a homopolymer of acrylic acid which still contains free carboxyl groups. For the purposes of the invention, this term should also encompass a partially neutralized polyacrylic acid.

The term "partially neutralized" in this connection should, however, in any case exclude neutralization of more than 90% of the free carboxyl groups.

The polyacrylic acid to be used should have a molecular weight of from 1500 to 8000.

A suitable polyacrylic acid, which is commercially available, is the product Norasol LMW45D from Norsohaas.

This is a partially neutralized polyacrylic acid having a molecular weight of 4500.

The builder tablet according to the invention can also comprise further customary additives, in particular it preferably comprises polyethylene glycol, preferably in an amount of 0.5–6% by weight. Suitable polyethylene glycols are those with a relatively high degree of ethoxylation, for example polyethylene glycols having a molecular weight of from 1000 to 6000.

The tablets according to the invention can further comprise customary tableting auxiliaries, such as, for example, microcrystalline cellulose and also sodium bicarbonate.

Hardness, solubility and abrasion resistance of the tablets are determined by the following methods of measurement:

The hardness of the tablets was determined using an Erichsen 486 hardness tester. The device measures the force which is necessary to break one tablet.

The solubility of a tablet is measured by immersing it inside a cage with 6 mm wide windows into a beaker containing 1 l of water at room temperature. The tablet is considered to be dissolved when all of the particles have passed through the windows of the cage.

The abrasion resistance of a tablet is measured by placing 10 tablets in a rectangular plastic container (170 mm×110 mm×110 mm) and rotating the container at a rate of 40 revolutions per minute for 1 minute. The amount of powder which is produced in the container is weighed and recorded as a percentage of the original weight of the tablet.

EXAMPLE 50 parts of sodium citrate dihydrate, 19 parts of sodium bicarbonate, 22 parts of Norasol LMW45D (polyacrylic acid), 3 parts of polyethylene glycol (6000) and 6 parts of Avicel (microcrystalline cellulose) were mixed in the dry state, and the resulting granular product was compressed to give tablets in a rotary press at a pressure of 70 KN.

The tablets according to the invention produced in this way were compared with tablets produced in the same way which contained the sodium salt of an acrylic acid/maleic acid copolymer (Sokalan CP5 from BASF) or the sodium salt of a partially neutralized acrylic acid/maleic acid copolymer (Sokalan CP45 from BASF) instead of polyacrylic acid.

The exact compositions of Comparative Examples A and B and the test results with regard to hardness, solubility and brittleness are given in the Table below.

These comparative experiments show that by adding polyacrylic acid in the acid form in accordance with the invention, the hardness of the tablets could be increased and their abrasion resistance could be improved, without impairment of the solubility properties.

TABLE

| Constituent | Comparative Examples | | Invention |
| --- | --- | --- | --- |
| | A(%) | B(%) | (%) |
| Citric acid | 15 | 15 | — |
| Na citrate dihydrate | 27 | 27 | 50 |
| Potassium bicarbonate | 27 | 27 | — |
| Sodium bicarbonate | — | — | 19 |
| Sokalan CP5 gran. ® (1) | 11 | — | — |
| Sokalan CP45 gran. ® (2) | 11 | 22 | — |
| Norasol LMW45D ® (3) | — | — | 22 |
| PEG6000 | 3 | 3 | 3 |
| Avicel ® (4) | 6 | 6 | 6 |
| Properties | Measurement results | | |
| Hardness (N) | 110 | 115 | 217 |
| Solubility (s) | 60–70 | 60–70 | 60–70 |
| Abrasion resistance (%) | 16 | 16 | 7 |

(1) gran. acrylic acid/maleic acid copolymer from BASF
(2) gran. Na salt of a partially neutralized acrylic acid/maleic acid copolymer from BASF
(3) polyacrylic acid in acid form, MW 4500, from Norsohaas
(4) microcrystalline cellulose

What is claimed is:

1. A water-soluble, water-softening builder in the form of a tablet comprising 40–98 % by weight of a combination of a) at least one organic, multifunctional polycarboxylic acid, or alkali metal salt thereof, and b) a polymer with water-softening properties in an a:b weight ratio of from 80:20 to 50:50, wherein the polymer with water-softening properties is a partially neutralized polyacrylic acid having a molecular weight of 1500–8000.

2. The builder as claimed in claim 1, wherein the multifunctional polycarboxylic acid is citric acid.

3. The builder as claimed in claim 1, which additionally comprises 0.5–6% by weight of polyethylene glycol.

4. A method of softening water, comprising addition of a builder tablet to water, wherein the tablet comprises 40–98% by weight of a combination of (a) a polyacrylic acid having a molecular weight of 1500 to 8000 and (b) an organic, multifunctional polycarboxylic acid, or alkali metal salt thereof.

5. A method of making a builder tablet, comprising combining a polyacrylic acid having a molecular weight of 1500 to 8000 together with an organic multifunctional polycarboxylic acid or alkali metal salt thereof in a builder tablet wherein the tablet comprises 40 to 98% by weight of said polyacrylic acid and multifunctional polycarboxylic acid.

* * * * *